United States Patent [19]

Fletcher et al.

[11] 4,030,047
[45] June 14, 1977

[54] OPTO-MECHANICAL SUBSYSTEM WITH TEMPERATURE COMPENSATION THROUGH ISOTHERMAL DESIGN

[76] Inventors: James C. Fletcher, Administrator of the National Aeronautics and Space Administration, with respect to an invention of; Francis E. Goodwin, Malibu, Calif.

[22] Filed: Apr. 28, 1976

[21] Appl. No.: 680,957

[52] U.S. Cl. .................. 331/94.5 D; 331/94.5 T; 350/253

[51] Int. Cl.² .......................................... H01S 3/02

[58] Field of Search ............... 331/94.5; 330/4.3; 350/242, 245, 253

[56] References Cited

UNITED STATES PATENTS

| | | | |
|---|---|---|---|
| 3,484,718 | 12/1969 | Foster | 331/94.5 T |
| 3,553,604 | 1/1971 | Andress et al. | 331/94.5 T |
| 3,581,231 | 5/1971 | Freiberg | 331/94.5 T |
| 3,808,553 | 4/1974 | Locke et al. | 331/94.5 D |

*Primary Examiner*—William L. Sikes
*Attorney, Agent, or Firm*—John O. Tresansky; Robert D. Marchant; John R. Manning

[57] ABSTRACT

An opto-mechanical subsystem for supporting a laser structure which minimizes changes in the alignment of the laser optics in response to temperature variations. Both optical and mechanical structural components of the system are formed of the same material, preferably beryllium, which is selected for high mechanical strength and good thermal conducting qualities. All mechanical and optical components are mounted and assembled to provide thorough thermal coupling throughout the subsystem to prevent the development of temperature gradients.

10 Claims, 4 Drawing Figures

OPTO-MECHANICAL SUBSYSTEM WITH TEMPERATURE COMPENSATION THROUGH ISOTHERMAL DESIGN

ORIGIN OF THE INVENTION

The invention described herein was made in the performance of work under a NASA contract and is subject to the provisions of Section 305 of the National Aeronautics and Space Act of 1958, public law 85-568 (72 stat. 435; U.S.C. 2457).

BACKGROUND OF THE INVENTION

1. Field of the Invention

The present invention relates generally to laser support structures, and more particularly to an optical and mechanical structure for laser support which is specially designed to prevent misalignment of laser optical components due to thermal gradients.

2. Background of the Invention

A major problem in space optics and in particular laser technology is that of maintaining the proper focal distances among optical components and in maintaining precise system alignment. Focal distances are critical to proper laser operation and must be maintained within close tolerances which can easily be exceeded by expansions and contractions in laser support structures caused by the existance of thermal gradients.

Thermal gradients of quite a substantial magnitude can occur in outer space, for example, where orbiting laser systems may be partially maintained at a very low temperature and partially heated by direct solar radiation or by the thermal output of the systems themselves. Accordingly, the neutralization of thermal gradients is an especially acute problem in extraterrestrial laser technology.

A number of apparatuses have been disclosed for providing thermally stable laser structures. One such device is disclosed in U.S Pat. No. 3,553,604 to Andress et al., issued Jan. 5, 1971. This patent discloses a laser support or holding device mounted within a housing having good heat conductivity and wherein the holding device itself is surrounded with heat insulating material for maintaining the temperature of the holding device constant along the axis of a laser. Similarly, U.S. Pat. No. 3,484,718 to Foster, issued Dec. 16, 1969, discloses a stabilized laser structure. The apparatus described in this patent includes an outer tubular support made from a material having a low coefficient of expansion, and an expansible tubular spacer within the outer support made from a material having a high coefficient of expansion. The proportionally opposed expansions between the spacer and the support are used to maintain uniform spacing between the laser mirrors. U.S. Pat. Nos. 3,808,553 and 3,793,595 to Locke et al and Russo et al, respectively, also disclose other thermally stabilized laser structures. However the devices disclosed in these patents, as well as all other known laser support structures, are generally deficient in that they are either too costly or complex to manufacture conveniently, or they do not provide a sufficient degree of thermal stability to meet the most exacting standards and thus fail to perform adequately in severe environments such as outer space. Accordingly there is a need for a further improvement in thermally compensated laser support structure.

SUMMARY OF THE INVENTION

Accordingly, one object of this invention is to provide a novel temperature compensated optical subsystem.

Another object of the present invention is the provision of an optomechanical system for an optical subsystem constructed according to a novel temperature compensating design.

A still further object of the present invention is the provision of an optical subsystem including optical and mechanical components with temperature compensation included through isothermal design.

Yet another object of the present invention is the provision of a novel optical subsystem having optical and mechanical components formed of beryllium for providing both mechanical strength and thermal stability.

Another object of the present invention is the provision of a novel thermally stable optical subsystem wherein both optical and mechanical components are formed of the same highly thermally conductive material.

Briefly, these and other objects of the present invention are achieved by constructing both the optical mirrors and supporting structure of an optical subsystem from the same highly thermally conducting material, preferably beryllium. All mechanical structures are fabricated as much as possible to employ thermal coupling interfaces among the structural elements. Furthermore, all structural elements are tied directly to a thermal interface comprising a base plate to which other structural components are directly coupled.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
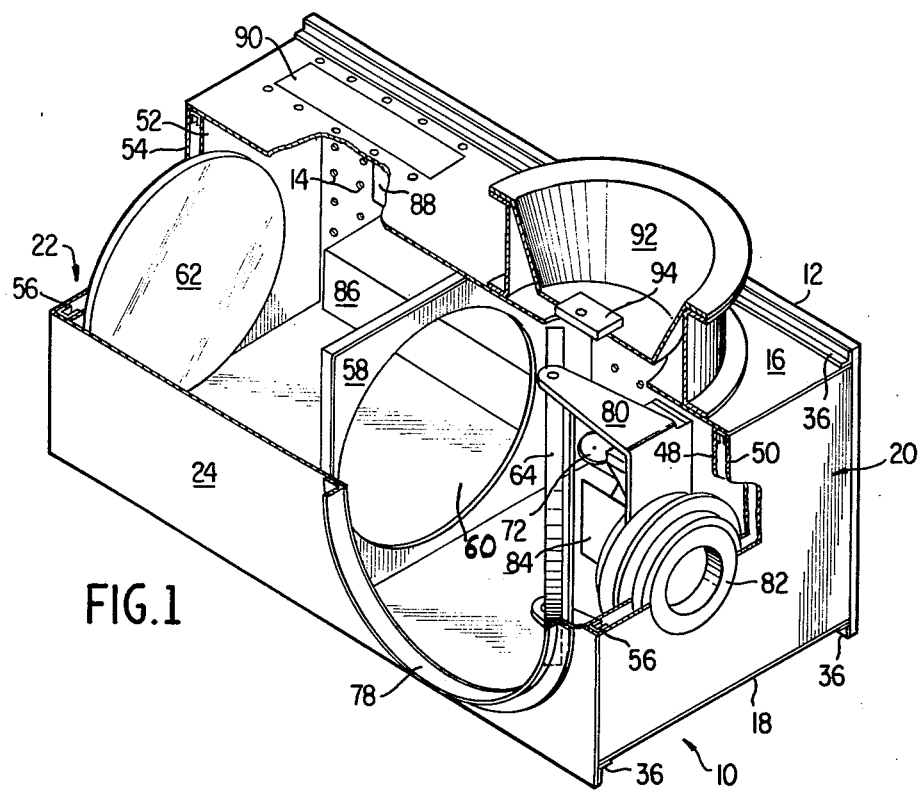
FIG. 1 is a partially cut-away perspective illustration of an optomechanical subsystem assembly constructed in accordance with the teachings of the present invention.

Referring now to the drawings, wherein like reference numerals designate identical or corresponding parts throughout the several views, and more particularly to FIG. 1 thereof, wherein a laser opto-mechanical subsystem assembly constructed in accordance with the principles of the present invention is referenced generally by the numeral 10. The assembly 10 is in the form of a six-sided rectangular container having a base plate 12 forming one side thereof. The base plate 12 is pictured as representing a side of the container, rather than its bottom surface, in view of the fact that it is the side surface of the subassembly 10 which is designed to be coupled to a supporting body, such as a spacecraft. Thus the structure of the invention is considered to be in an upright or normal orientation as illustrated in FIG. 1.

The base plate 12 may include a matrix of appe 14 for the purpose of mounting internal components and reducing the weight of the base plate. The base plate 12 is joined to a top plate 16, a bottom plate 18, a forward end wall assembly 20 and a rear end wall assembly 22. A sidewall 24 is coupled to the top and bottom plates 16 and 18 and to the end wall assemblies 20 and 22 to complete the outer structural skeleton of the optomechanical subsystem assembly 10.

The subsystem assembly 10 is constructed to provide the maximum structural and thermal stability so that neither mechanical stress nor uneven or sporadic heating of portions of the structure will cause it to distort significantly or to render the laser and associated components within it to become inoperational or inaccurate. The shell structure of the illustrated device best meets these requirements, especially where the optical elements are supported on walls and bulkheads of the rigid outer shell. Furthermore, all interior elements are hardmounted with a minimum of cantilever or post-type supports to minimize the possibility of component movement due to mechanical or thermal stress. The material of which the apparatus is formed is also chosen to provide the best thermal and mechanical stability. Beryllium was chosen as the ideal metal for this purpose, as will be explained in greater detail subsequently. Furthermore, additional thermal and mechanical stability is provided in accordance with the teachings of the present invention by the use of a monolythic structure with a minimum of thermal and mechanical interstices and junctures. Furthermore, in accordance with the present invention, all structural elements of the apparatus 10 are tied directly to the base plate 12, which forms a thermal interface with the supporting structure (such as a spacecraft as mentioned previously) and are also coupled to each other by continuous material couplings of large surface area to maximize heat transfer and to minimize the possibility that substantial thermal gradients could develop within the structure.

One particular example of the use of continuous material couplings of large surface area to maximize thermal coupling among the structural elements is found in the manner in which the base plate 12, top and bottom plates 16 and 18, and side plate 24 are coupled together. In each instance, a bracket and flange construction is used, as shown in greater detail in FIG. 2.

Figure 2:
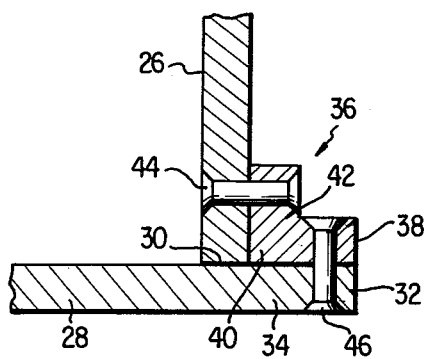
FIG. 2 is an enlarged sectional view of a joint construction utilized in the apparatus of FIG. 1.

Referring particularly to FIG. 2, a vertical wall section 26 is shown coupled to a horizontal wall section 28. The end surface 30 of the vertical wall section 26 is bonded by means of a suitable conventional epoxy resin, or an equivalent bonding agent, to a portion of the horizontal wall section 28. The junction of the vertical wall section and the horizontal wall section is made at a point spaced from the end surface 32 of the horizontal wall section, so that a flange portion 34 is defined along the entire length of the horizontal wall section 28. A reinforcing block 36 having a L-shaped cross sectional configuration is positioned on the flange portion 34 with its end surface 38 positioned in the same plane as the end surface 32 of the horizontal wall section 28. One arm 40 of the reinforcing block 36 is bonded to the adjacent surface of the flange portion 34, while a second arm 42 is similarly bonded to the adjacent portion of the vertical wall section 26. The same adhesive is used for this bonding as described above. Rivets 44 and 46 are also used along the length of the reinforcing bracket to provide additional mechanical strength to the junction formed between the two wall sections 26 and 28 and the reinforcing block 36. The resulting joint assembly is very rigid from a structural point of view and also provides an efficient thermal coupling between the vertical and horizontal walls 26 and 28 because of the relatively large coupling area provided by the reinforcing block 36.

Joints of the type described with reference to FIG. 2 are used to couple the base plate 12 to the top and bottom plates 16 and 18, and also to couple the top and bottom plates to sidewall 24.

The end walls 20 and 22 of the assembly 10 differ from the sidewalls in that they are of compound structure including two separate panels. For example, the forward end wall 20 includes an inner panel 48 and an outer panel 50. Similarly, the rear end wall 22 includes an inner panel 52 and an outer panel 54. The inner and outer panels of each of the end walls are joined together around their entire periphery by a U-shaped reinforcing member 56. The reinforcing member 56 need not be continuous around the periphery of each end wall, but may include four separate lengths, each corresponding to the length of one edge of the end wall. The U-shaped reinforcing members are secured to the inner and outer end wall panels by the same type of bond and rivet coupling technique as is described above with reference to FIG. 2. The only significant difference in the end wall structure is that the reinforcing member is U-shaped, rather than L-shaped. Although the rivets involved are not shown in the structure illustrated in FIG. 1, it will be understood by those skilled in the art that the number of rivets per inch may be varied in accordance with approved engineering practice provided a sufficient number of rivets is used to provide a secure structural joint. It is noted that the bond and rivet process used in the structure of the present invention is a process conventionally used by the Hughes Aircraft Company in spacecraft construction, and is identified by the Hughes references H.P. 16-25 and H.P. 20-1805.

The forward and rear end wall assemblies 20 and 22 are secured to the sidewall structure of the apparatus illustrated in FIG. 1 by the same bond and rivet technique described above to enclose the subsystem assembly 10. A bulkhead 58 of similar structure is also fastened by the same technique at approximately the midpoint of the assembly 10 to provide additional structural rigidity to the overall assembly. The bulkhead includes a large, centrally located round aperture 60 to permit optical signals to pass unimpeded along the longitudinal axis of the illustrated structure.

Figure 3:
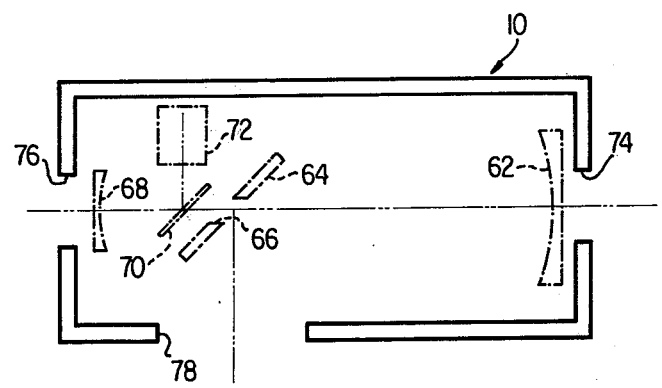
FIG. 3 is a schematic illustration showing the positions of various optical components within the structure illustrated in FIG. 1; and, FIG. 4 is a partially cut-away side view of an assembly used for mounting the primary mirror illustrated in FIG. 1.

The optical elements contained within the subassembly 10 are shown schematically in FIG. 3. These include a primary mirror 62, a rotatably mounted pointing mirror 64 having a central apperture 66, a secondary mirror 68 and a folding mirror 70. Also shown in FIG. 3 in schematic form is the location of an image motion compensator and detector 72 and three major apertures in the side walls of the subassembly 10. These apertures include a primary mirror mounting aperture 74, a gimbal mounting aperture 76 and a pointing mirror aperture 78.

Referring again to FIG. 1, some additional features of the laser assembly are shown, such as a gimbal assembly 80 for the pointing mirror 64. The gimbal assembly is supported by means of a gimbal mounting device 82 secured within the gimbal mounting aperture 76. A folding assembly 84 for the secondary mirror 68 is also shown. Furthermore, the mechanical details of the image motion compensator along with its combining optics are also illustrated at 72 in FIG. 1. A housing 86 is also shown indicating the position occupied by the laser local oscillator assembly and a second housing 88 is illustrated to show the position of the beacon assembly in the completed structure.

On the top plate 16 a removable connector plate 90 is illustrated as is a dish-shaped radiation cooler 92 having an optical mixer assembly housing 94 positioned at the center thereof.

It will be appreciated by those skilled in the art that the structural details of the laser system and its driving and controlling components are in themselves well known, and do not form a portion of the present invention which is directed to the housing structure and to the manner in which the optics and the housing structure interface with one another from a thermal and structural point of view.

Figure 4:
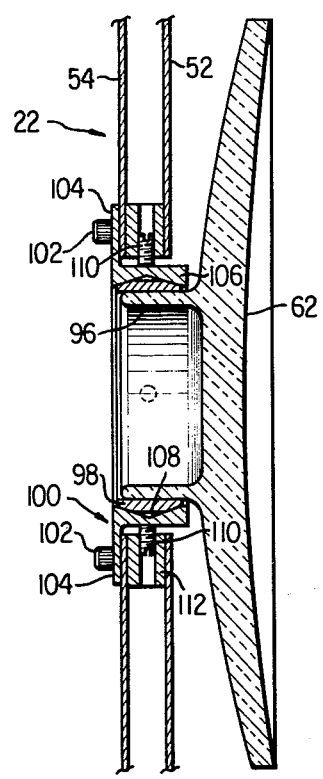

Attention is now directed to FIG. 4 wherein the mounting structure of primary mirror 62 is illustrated. As shown, the mirror 62 includes a rearwardly extending cylindrical flange 96 which is symetrically positioned about the center of the rear surface of the mirror. The flange is formed integral with the main body of the mirror, as by casting, for example. A cylindrical slip ring 98 is positioned around the cylindrical flange 96 and frictionally engages the outer surface of the flange 96. A flanged clamp ring 100 is secured in the primary mirror mounting aperture 74 by means of a plurality of bolts or other suitable fasteners 102 evenly spaced about the periphery thereof and extending through a flange portion 104 thereof which overlaps a portion of the outer panel 54 of the end wall structure 22. The flanged clamp ring 100 also includes an inwardly extending annular clamping member 106 which fits around the outer periphery of the slip ring 98. The clamping member 106 includes a gripping face 108 which slopes outwardly from a central point to facilitate centering of the slip ring therein. A plurality of adjusting screws 110 are threaded into a cylindrical ring member 112 which is positioned between the inner and outer panels 52 and 54 so as to surround the clamping member 106, and which includes a suitable plurality of threaded apertures for receiving the screws 110. By tightning the screws 110, a secure frictional coupling is maintained among the various elements for securing the primary mirror 62 in its place within the rear wall assembly 22. The described mounting procedure provides a secure mechanical coupling as well as a reliable thermal interface among the mirror structure, the support structure and the end wall structure.

All lenses, mirrors and optical components are mounted in adjustable thermally conducting clamp rings of essentially the same type as described above.

In selecting the material from which to construct the previously described apparatus, the overriding consideration was that both the optics and the structural framework of the system would be exposed to direct solar radiation. Thermal stability, that is, the resistance of the structure to mechanical deformation in the presence of thermal gradients, was a most important design consideration. Mechanical stability and the resistance of the structure to mechanical deformation in the presence of mechanical stress was also an important design characteristic in the context of the present invention. Thermal stability is, of course, directly proportional to the thermal conductivity and inversely proportional to the linear coefficient of expansion of the material used for the structure. Mechanical stability, on the other hand, is proportional to the stiffness modulus and strength of the construction material, and is inversely proportional to the density of the material. Thus it was necessary to select a material possessing properties which would result in the best possible compromise in the environment of the present invention. Three possible materials were considered, beryllium, aluminum, and magnesium. The significant properties of these materials is summarized in the TABLE below, wherein the various factors have been normalized to unity for beryllium for ease and comparison.

TABLE

| COMPARISON OF CANDIDATE MATERIALS | | | |
|---|---|---|---|
| Property | Beryllium | Aluminum | Magnesium |
| Modulus (stiffness) | 1 | 0.245 | 0.155 |
| Strength | 1 | 0.71 | 1.14 |
| Thermal conductivity | 1 | 1.17 | 0.65 |
| Expansion$^{-1}$ | 1 | 0.48 | 0.51 |
| Density$^{-1}$ | 1 | 0.68 | 1.06 |
| Overall merit | 1 | 0.067 | 0.067 |

The overall merit figure listed at the bottom of the TABLE is defined as the product of stiffness modulus and thermal conductivity divided by the coefficient of expansion and density. It can clearly be seen from the TABLE that beryllium has an overall figure of merit which is some 15 times greater than that of either aluminum or magnesium. Thus beryllium was selected as the material most desirable for use in the environment of the present invention.

In addition to selecting beryllium as the material for the outer housing structure of the apparatus of the present invention, it was determined that beryllium would also be the most suitable material for the optical components of the system, and consequently the concept of an isothermal design was used. Among the optical components, all mirrors are constructed of beryllium with an electroless nickel plating. The fabrication of optical services using these materials is routine and well known to those skilled in the art. This process and the construction of the optical components of beryllium results in the production of light weight components with high stability in terms of both mechanical strength and resistance to thermal gradients.

In accordance with the foregoing description, the present invention provides an opto-mechanical subsystem for a laser communication receiver terminal which can operate without distortion in a solar vacuum environment. Temperature compensation within the optical system is achieved by fabricating the reflective optics and supporting structure of the same, highly thermally conducting material. The focal distances of the optical elements change as a function of temperature in exactly the same way as the overall spacing of the elements changes due to the use of the same material throughout. Consequently, perfect focus is maintained throughout the optical system at all temperatures. To insure that thermal gradients do not develop within the system, all optical components are thermally as well as mechanically mounted to the frame structure. Thus relative uniformity of temperature is maintained between the structural elements and the optics themselves. The high thermal conductivity of the optical and structural material accordingly prevents excessive temperature gradients from developing and permits perfect alignment to be maintained among the components. Furthermore, the present invention eliminates the need for heavy and cumbersome sun shields since the optical performance of the system is not effected by impinging solar energy.

It will, of course, be appreciated by those skilled in the art that the techniques of construction set forth in the present application are not limited to laser systems of the type specifically described, but are equally applicable to all optical systems designed specifically for use in outer space and to optical systems of any type in which temperature compensation is a critical factor.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A thermally self compensating optical system and a mechanical support structure therefor, comprising:
   housing means constructed of a selected material having a high thermal conductivity for supporting said optical system, said housing means constructed so as to minimize the existence of thermal gradients therein;
   an optical system having critical focal parameters mounted within said housing, said optical system comprising optical system comprising optical elements formed of said same selected material as said housing means whereby said focal parameters are not effected by changes in temperature, said optical elements coupled both mechanically and thermally to said housing means to minimize the existence of thermal gradients therebetween.

2. A system as in claim 1, wherein:
   said housing means is formed of wall panels including a base member, side walls and end walls and end wall assemblies.

3. A system as in claim 2, wherein:
   said base member, side walls and end wall assemblies are secured together by both bonding and riveting, and wherein all joints between said base member, side walls and end wall assemblies are structurally reinforced and rendered more thermally conductive by the use of reinforcing members.

4. A system as in claim 3, wherein:
   said end wall assemblies comprise inner and outer panels having a U-shaped reinforcing member extending around the periphery thereof.

5. A system as in claim 4, wherein:
   said housing means further includes a reinforcing bulkhead secured to a central internal portion thereof.

6. A system as in claim 1, wherein:
   said selected material is beryllium.

7. A system as in claim 1, wherein:
   said optical system comprises a plurality of mirrors, said parameters are focal distances, and said focal distances of said mirrors change as a function of temperature in the same manner as the spacing of said mirrors due to the use of the same material throughout said optical system and said mechanical support structure.

8. A system as in claim 1, wherein:
   said optical elements are mounted to said housing means using adjustable clamp ring means for providing a positive mechanical and thermal coupling between said optical system and said housing means.

9. A system as in claim 8, wherein:
   said selected material is beryllium.

10. A system as in claim 9, wherein:
    said optical system includes primary, secondary and pointing mirrors for a laser communication system.

* * * * *